United States Patent [19]

Earl

[11] 3,795,039
[45] Mar. 5, 1974

[54] METHOD OF MAKING AN ELECTROLYTIC CONDUCTIVITY CELL

[75] Inventor: Roger Eric Earl, Clifton, England

[73] Assignee: L. T. H. Electronics Limited, Bedfordshire, England

[22] Filed: Feb. 29, 1972

[21] Appl. No.: 230,308

[30] Foreign Application Priority Data
Mar. 10, 1971 Great Britain...................... 6470/71

[52] U.S. Cl.................... 29/592, 264/261, 267/277, 324/30 B
[51] Int. Cl. .......................................... G01n 27/00
[58] Field of Search..... 29/592, 418, 423, 426, 427; 324/30 B; 264/261, 277

[56] References Cited
UNITED STATES PATENTS

| 3,701,006 | 10/1972 | Volkel et al....................... 324/30 B |
| 3,374,672 | 3/1968 | Horne ............................... 324/30 B |
| 3,240,693 | 3/1966 | Gardner............................ 324/30 B |
| 3,234,630 | 2/1966 | Kenyon................................ 29/592 |

FOREIGN PATENTS OR APPLICATIONS

| 361,679 | 6/1962 | Switzerland.......................... 29/592 |
| 1,123,355 | 8/1968 | Great Britain ..................... 324/30 B |

Primary Examiner—Charles W. Lanham
Assistant Examiner—D. C. Crane
Attorney, Agent, or Firm—Sughrue, Rothwell, Mion, Zinn & Macpeak

[57] ABSTRACT

A method of making electrolytic conductivity cells and a mandrel therefor in which the mandrel comprises a plurality of rod like sections each having at one end thereof a reduced diameter portion and a threaded stud for engaging a threaded recess in an adjacent section so that all the sections can be screwed together providing recesses along the length of the mandrel each formed by a reduced diameter portion of one section and an abutting end of normal diameter of an adjacent section. The step between the normal and reduced diameter portions of each section being undercut to provide a cutting edge. The method comprises slipping over the reduced diameter portion of each section a carbon graphite ring electrode, screwing together all the sections so that the electrodes are clamped in the recess, introducing the assembly into a mould, introducing plastics material in the mould to set and form the body of the cell and then applying pressure to one end of the mandrel to cause the cutting edges to shear off that portion of each electrode held in a recess thus leaving a smooth bore through the cell body. An alternative form of construction provides a mandrel having sections each with an internal peripheral recess at one end to hold an electrode against an abutting end of an adjacent section, moulding the cell body as above and then applying pressure to the mandrel to shear off the outer periphery of each electrode to form a smooth outer surface for the cell body.

8 Claims, 7 Drawing Figures

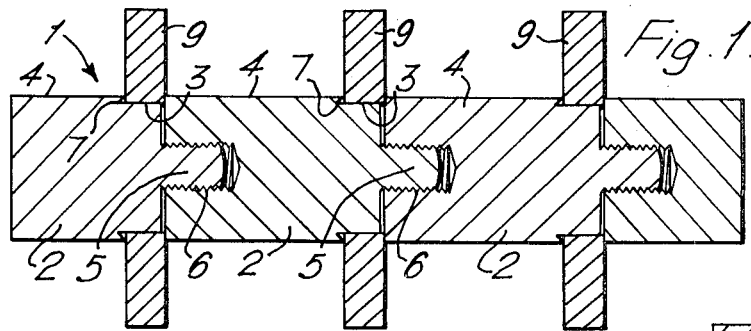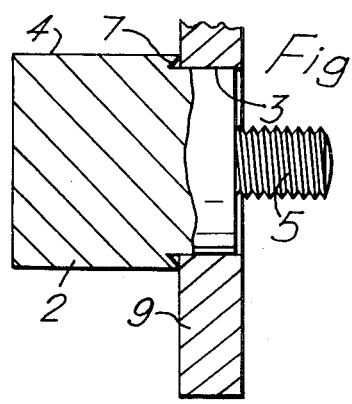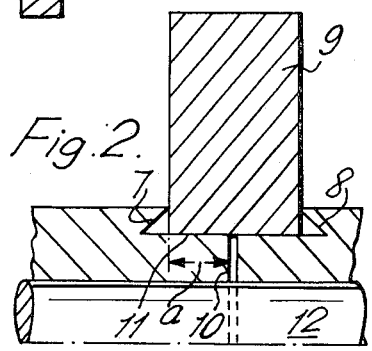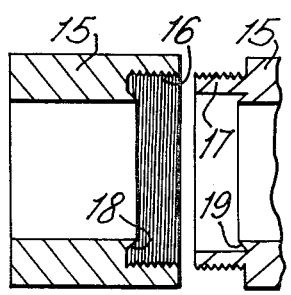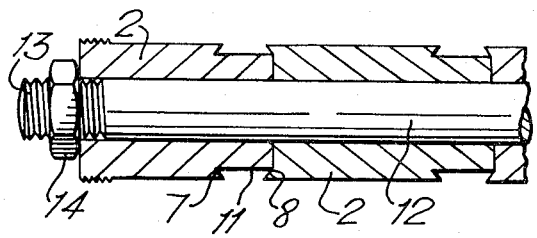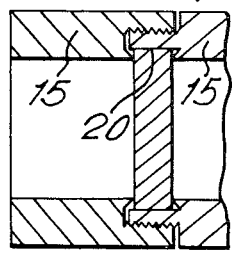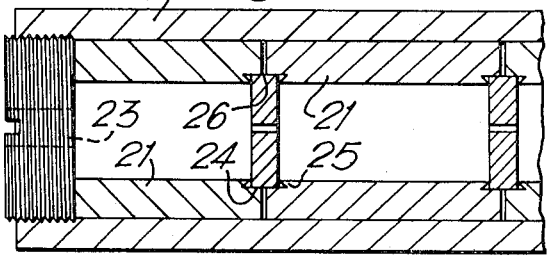

METHOD OF MAKING AN ELECTROLYTIC CONDUCTIVITY CELL

BACKGROUND OF THE INVENTION

1. Field of the Invention

This invention relates to a method of making electrolytic conductivity measuring cells as employed for measuring the electrical resistance of liquids. From such resistance measurements other physical values relating to the liquid may be determined such as liquid purity or solution strength.

2. Prior Art

One known form of electrolytic conductivity measuring cell is made by embedding resin impregnated carbon rings in a body of insulating material and forming a bore through the insulating material coaxial with and of the same diameter as the bore in the carbon rings. The bore is machined so that the internal circumferential surfaces of the carbon rings form part of a machined surface.

The necessity of machining the bore of the cell after moulding introduces an additional operation which due to the fragile nature of the carbon electrodes can cause damage to the electrodes and may leave a comparatively rough surface to which liquid entrained matter can subsequently adhere causing variation in the electrical characteristics of the cell, fouling of the cell and eventually severe restriction of the liquid flow unless the cell bore is cleaned at regular and frequent intervals. The machining of the cell should be accurately controlled if a precise final characteristic or constant value is to be achieved.

In order to provide a simplified method of constructing a liquid conductivity measuring cell which retains the advantages of a plastic moulded cell over previously known glass cells and at the same time mitigates some of the disadvantages mentioned above, I developed a method of manufacturing a liquid conductivity cell comprising positioning a plurality of electrodes in a predetermined spaced apart relationship by means of a mandrel having alternate sections of rigid and flexible material, the mandrel being compressed so that the flexible material expands to grip the electrodes and maintain them in said predetermined spaced apart relationship, placing the mandrel with the electrodes in a mould into which plastics material is then introduced to set and form the body of the cell with the electrodes embedded therein and removing compression from the mandrel whereby the flexible material shrinks to allow the mandrel to be removed from the moulded body of the cell, all as described in my U.K. Pat. No. 1,299,404.

Although different flexible materials may be used for the mandrel I have found P.T.F.E. to be one of the most suitable but it does not always shrink by a sufficient amount on removal of compression from the mandrel to allow it to be withdrawn easily from the moulded body of the cell. As a result I have invented a different method of making a liquid conductivity cell utilizing a mandrel without sections of flexible material and which method takes advantage of the fragile nature of the carbon ring electrodes which in the method previously referred to of machining the bore could prove to be a serious disadvantage.

SUMMARY

In the method described in this application the carbon rings are held in a predetermined spaced apart relationship by a mandrel having recesses about its periphery in which are seated the electrodes, the electrodes and the mandrel being placed in a mould where plastics material is then introduced to set and form the cell body. The mandrel is removed by applying pressure to one end which, due to the fragile nature of the carbon ring electrodes, causes that part of each electrode held in a peripheral recess to shear away from the rest of the electrode leaving a smooth bore of moulded plastics material and internal circumferential surfaces of carbon rings.

To effect a clean break between that part of each ring embedded in the cell body and that part held in a recess, the walls of the recess are undercut to receive the material sheared off from the main body of a ring electrode. Also such undercutting provides a sharp edge which, if at least the surface of the mandrel is hardened, can cut cleanly into a ring without becoming dulled after repeated use.

To allow seating of the electrodes in the recesses, the mandrel, in its preferred form, is made up of a plurality of sections including sections having at least one end portion of a diameter less than that of the remaining portion. Carbon ring electrodes are slipped over the reduced diameter portions and the remaining portions of adjacent sections are butted up to the reduced diameter portions clamping the carbon rings against the faces of the abutting sections and the shoulders between the portions of different diameters.

BRIEF DESCRIPTION OF THE DRAWINGS

The mandrel may take various forms, some of which will now be described with reference to the accompanying drawings in which:

FIG. 1 shows one form of mandrel for use in a method of making a liquid conductivity cell in accordance with this invention;

FIG. 2 shows a detail of an alternative form of mandrel;

FIG. 3 shows one section of another form of mandrel;

FIG. 4 shows assembled sections of a mandrel having recesses formed as illustrated in FIG. 2;

FIG. 5 shows a part of one form of mandrel for use in making liquid conductivity cells whose liquid-contacting electrode surfaces are disposed about the periphery of the cell body;

FIG. 6 shows the sections illustrated in FIG. 5 in the separated position; and

FIG. 7 shows part of an alternative form of mandrel to that shown in FIG. 5.

DETAILED DESCRIPTION OF PREFERRED EMBODIMENTS

The following forms of mandrel are used to accurately locate one or more electrodes in predetermined spaced apart positions so that the mandrel together with the resin impregnated carbon ring electrodes can be introduced into a mould, plastics material or a resin then being injected into the mould where it sets to form the body of the cell. The mandrel is then withdrawn as will be described later on with reference to the various forms of mandrel illustrated in the accompanying drawings. The cell so formed has a smooth bore through which liquid is passed to measure its conductivity.

Instead of the cell having a central bore therethrough in which the internal circumferential surfaces of the carbon rings form the electrode faces, the outer circumferential surfaces of the rings may form the electrode faces in those applications where the cell is located in a pipe and the liquid arranged to pass over the outer circumferential surface of the cell.

Referring now to FIG. 1, the mandrel 1 comprises sections 2, each having an end portion 3 whose diameter is less than the remaining portion 4 by about 0.005 inch. The reduced diameter end portion 3 has projecting therefrom a threaded stud 5 for screwing into a correspondingly threaded bore 6 in an adjacent section. The shoulder 7 formed between the portions of different diameter are undercut and the end face of each portion of larger diameter is preferable also undercut as shown at 8 in FIG. 2.

The axial length of each portion 3 of reduced diameter is slightly less than the thickness of the carbon ring electrodes 9 to allow for manufacturing tolerances in the latter. In consequence when the sections 2 are screwed together after first slipping a carbon ring onto each portion of reduced diameter to form the mandrel, each section may not fully abut an adjacent section leaving a small gap as indicated in FIG. 2.

Instead of forming the mandrel from solid sections of rod, each section 2 may comprise a cylinder as shown in FIGS. 2 and 4, each cylindrical section having an end portion 11 of reduced diameter, and in FIG. 2 opposite end portions of reduced diameter. The cylindrical sections are supported on a central rod 12 having threaded ends 13 on which are mounted nuts 14 so that the cylindrical sections can be clamped together on the rod to grip the carbon ring electrodes and hold them in a predetermined spaced apart position as fixed by the axial lengths of the sections.

Where cylindrical sections are used each having both ends of reduced diameter, the axial length $a$ of the reduced diameter portion is slightly less than half the thickness of a ring to allow for manufacturing tolerances.

When making the mandrel, the sections are assembled and the surface of the sections are cyanide hardened to a depth of about 0.01 inch and then ground down to size. This provides a hardened edge to the undercut shoulders between the portions of different diameter so that when the mandrel is removed from the moulded body of the cell the hardened edge cleanly shears off an annulus of 0.005 inch thickness, the cutoff part of the cell being accommodated in the undercut part of the shoulder thus allowing easy removal of the mandrel. Furthermore the mandrel may be coated with a silicone grease or other release agent before the mandrel is introduced into the mould.

To form a cell in which the outer circumferential surface of the rings form the electrode faces, a mandrel shown in FIGS. 5 to 7 may be used. The mandrel shown in FIGS. 5 and 6 comprises cylindrical sections 15 each having end portions formed with an enlarged threaded bore 16 for receiving a threaded flange 17 of an adjacent section. The enlarged bore 16 has an undercut portion 18 and the flange 17 has a similar undercut portion 19 so that when the sections are screwed together a recess 20 is formed having undercut sides for gripping a carbon ring electrode, as shown in FIG. 5.

An alternative construction is shown in FIG. 7 which shows a mandrel having sections 21 held within a cylinder 22 by means of threaded end plugs 23. Each section has at each end thereof an enlarged bore 24 undercut at 25 so that adjacent sections form recesses 26 to hold the carbon ring electrodes. One end plug has an aperture 27 therein to allow the plastics material or resin to be injected into the interior of the sections which form the mould each ring electrode having an aperture therein to allow the injected material to flow down the length of the cell and to allow leads to be soldered to tinned circlips on the rings and brought out from the cell body.

The mandrel is removed by removing the plugs and applying pressure to the sections which shear off about 0.005 inch from the carbon rings in the same manner as described above with reference to the mandrels shown in FIGS. 1 to 4.

Preferably the electrodes are resin impregnated carbon graphite and I have found Morganite type CY9WA material to shear cleanly when using the mandrels described herein to form cells in accordance with the method of this invention. The diameter of the rods or cylinders used for the sections of the mandrel shown in FIGS. 1 to 4 may be in the order of 0.75 inch.

What is claimed is:

1. A method of making an electrolytic conductivity cell comprising clamping a peripheral portion of at least one electrode in position on a mandrel, placing the mandrel with the electrode in a mould, introducing material into the mould to set and form the body of the cell with the electrode embedded therein and after the material has set applying pressure to said mandrel to shear off said peripheral portion of said electrode so that on removal of said mandrel from said mould the moulded body lies flush with the exposed edge of said electrode.

2. A method according to claim 1, wherein said electrode comprises an annulus and said peripheral portion is the inner peripheral portion of said annulus.

3. A method according to claim 1, including clamping the peripheral portion of each of a plurality of electrodes at predetermined spaced apart positions on said mandrel before introducing said mandrel and said electrodes into said mould.

4. A method according to claim 1, wherein said electrode comprises a ring of resin impregnated carbon graphite.

5. A method of making 5, electrolytic conductivity cell comprising clamping inner peripheral portions of carbon graphite ring electrodes on a mandrel at spaced apart positions thereon, placing said mandrel and said electrodes into a mould, introducing plastics material into said mould to set and form the body of said cell with the electrodes embedded therein, and applying pressure to one end of said mandrel to shear off said inner peripheral portions thereby leaving the exposed edge portions of said electrodes laying flush with the bore in said plastics material forming said body.

6. A method according to claim 6, wherein said mandrel comprises a plurality of cylindrical sections each with a reduced diameter end portion, and an undercut portion between the periphery of each said section and its reduced diameter portion, said electrodes being pushed onto said reduced diameter portions and the mandrel assembled from said sections to clamp the electrodes into predetermined spaced apart positions.

7. A method of making an electrolytic conductivity cell comprising clamping outer peripheral portions of carbon graphite ring electrodes in a hollow cyindrical mandrel at spaced apart positions therein, introducing plastics material into said hollow mandrel to set and form the body of said cell with the electrodes embedded therein, and applying pressure to one end of said mandrel to shear off said outer peripheral portions thereby leaving the exposed edge portions of said electrodes laying flush with the outer surface of plastics material forming said body.

8. A method according to claim 7, wherein said mandrel comprises a plurality of cylindrical sections each with an increased internal diameter end portion, and an undercut portion between the internal periphery of each said section and its increased internal diameter portion, said electrodes being pushed into said increased diameter portions and the mandrel assembled from said sections to clamp the electrodes into predetermined spaced apart positions within said cylindrical sections.

* * * * *